(12) United States Patent
Hashizume

(10) Patent No.: US 6,547,455 B1
(45) Date of Patent: Apr. 15, 2003

(54) OPTICAL MODULE FOR A SEMICONDUCTOR LIGHT-EMITTING DEVICE

(75) Inventor: Hideki Hashizume, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 189 days.

(21) Appl. No.: 09/688,084

(22) Filed: Oct. 16, 2000

(30) Foreign Application Priority Data

Oct. 18, 1999 (JP) .......................................... 11-295876

(51) Int. Cl.⁷ ................................................. G02B 6/36
(52) U.S. Cl. .......................................... 385/93; 359/668
(58) Field of Search ............................... 385/60, 66, 72, 385/78, 88, 91, 93, 34, 35; 359/668, 710, 796

(56) References Cited

U.S. PATENT DOCUMENTS

| | | | |
|---|---|---|---|
| 5,973,853 A | * 10/1999 | Gaebe et al. | ................ 359/668 |
| 5,973,862 A | 10/1999 | Hashizume | ................ 359/819 |
| 6,179,483 B1 | * 1/2001 | Kanazawa | ................ 385/93 |

* cited by examiner

*Primary Examiner*—Lynn D. Feild
*Assistant Examiner*—Son V. Nguyen
(74) *Attorney, Agent, or Firm*—Whitham, Curtis & Christofferson, P.C.

(57) ABSTRACT

An optical module includes a semiconductor light-emitting device and a lens structure, which are held by a housing while being optically aligned with each other. A ferrule of an optical plug to which the optical module is to be coupled is fittingly received by the housing. The lens structure includes a pair of cylindrical lens portions, which are oriented orthogonal to each other and located at positions spaced from each other in the optical axis direction.

12 Claims, 3 Drawing Sheets

OPTICAL MODULE FOR A SEMICONDUCTOR LIGHT-EMITTING DEVICE

BACKGROUND OF THE INVENTION

The present invention relates to an optical module in which a semiconductor light-emitting device and a lens structure are held by a housing while being optically aligned with each other. More particularly, the invention relates to an optical module using a lens structure in which two cylindrical lens portions are respectively located at the positions of first surface (light incident surface) and a second surface (light emission surface), while being oriented orthogonal to each other. The optical module well accepts a semiconductor light-emitting device whose aspect ratio of emitting light is large when it is assembled into the optical module.

An optical module is a part or assembly which holds a semiconductor light-emitting device (e.g., a laser diode) and lenses in a state that the device and lenses are optically aligned with each other, and it is used in a variety of fields. An optical module used in a computer system having a data communication function, for example, includes a semiconductor light-emitting device, lenses, and a housing which holds the device and lenses and fittingly receives a mating ferrule of an optical plug. The semiconductor light-emitting device, and an optical fiber in the ferrule are optically coupled with each other by means of the lenses when the optical plug is coupled to the optical module. An optical module used for a certain type of the bar code reader includes a semiconductor light-emitting device, lenses and a housing for holding the device and lenses in a state that the device and lenses are optically aligned with each other. Light emitted from the semiconductor light-emitting device of the optical module is propagated in space as a beam of a predetermined beam waist.

A spherical lens is usually used for the lens to be assembled into the optical module because such a lens is manufactured easily, highly accurately and inexpensively by only the machining. A radiation pattern of the laser diode of relatively small output power has a profile being substantially circular. Therefore, even when the spherical lens is used, there is less chance that serious problem arises.

In the case of the laser diode of large output power, the light emitted from the diode largely differs, in radiation angle (divergence) and width of the light emitting area, between the horizontal direction and the vertical direction with respect to the active layer (the aspect ratio is large). For this reason, a general spherical lens or a composite lens system including two lens or more can not concurrently adjust the aspect ratio and radiation angle of the emitted light.

To efficiently couple the emitted or radiated light of a large aspect ratio to an optical fiber having a circular cross section, or to propagate the emitted light as a beam having a circular beam waist in space, it is necessary to design the lens having different radii of curvature for the light components of the horizontal and vertical directions. Such a lens is generally an elliptical lens. The curved-surface profile of the elliptical lens is complex. Accordingly, it is technically difficult to manufacture a mold for injection molding.

SUMMARY OF THE INVENTION

Accordingly, an object of the present invention is to provide an optical module having a structure which is able to easily and inexpensively realize high coupling efficiency in its coupling to an optical fiber even if a semiconductor light-emitting device of the module is large in aspect ratio and hence its coupling to the optical fiber is difficult.

Another object of the invention is to provide a structure which is able to easily and inexpensively realize an optical module which enables light emitted from a light emitting point to propagate in the form of a beam with a circular beam waist in space even if a semiconductor light-emitting device of the module is large in aspect ratio.

Still another object of the invention is to provide a lens structure which can vary a radiation pattern, as desired, independently between the horizontal direction and the vertical direction, and more particularly to provide a lens structure adaptable for the optical module.

According to an aspect of the invention, there is provided an optical module having a semiconductor light-emitting device and a lens structure, which are held by a housing while being optically aligned with each other. The lens structure includes a pair of cylindrical lens portions, which are oriented orthogonal to each other and located at positions spaced from each other in an optical axis direction.

According to another aspect, there is provided an optical module having a semiconductor light-emitting device and a lens structure which are held by a housing adapted to fittingly receive a ferrule, so that the semiconductor light-emitting device and an optical fiber of the ferrule are optically coupled with each other by the lens structure. The optical module may be constructed as a pig-tail type module in which the ferrule holding the optical fiber is soldered and fixed to the housing. The optical module may be constructed as a receptacle type module in which the ferrule of an optical plug is detachably mounted to the housing. The lens structure includes a pair of cylindrical lens portions, which are oriented orthogonal to each other and located at positions spaced from each other in the optical axis direction.

In each of those lens structure, it is preferable that the cylindrical lens portions are located on both side surfaces of a plate-like base, while being oriented orthogonal to each other, and the lens structure is formed with a one-piece molding piece of transparent resin. The cylindrical lens portion is preferably profiled as a non-spherical surface defined by, for example, the following equation $$Z=((1/R)X^2)/(1+(1-(1+K(1/R)^2X^2)^{1/2}),$$

where Z is an amount of cutting measured from a planar surface, and R and K are constants.

In a case where the cylindrical lens portions are located on both side surfaces of a plate-like base, while being oriented orthogonal to each other, and the base and the lens portions are formed as a one-piece molding piece of transparent resin, the effective lens surfaces for the horizontal and vertical optical components of the emitted light can be located at respective positions distanced from a light emitting points using a thickness of the base portion. Further, the curvatures of the lens surfaces can be selected independently in design. Accordingly, optimum design of high freedom is realized.

The present disclosure relates to the subject matter contained in Japanese patent application No. Hei. 11-295876 (filed on Oct. 18, 1999), which is expressly incorporated herein by reference in its entirety.

DESCRIPTION OF THE PREFERRED EMBODIMENT

Figure 1A:
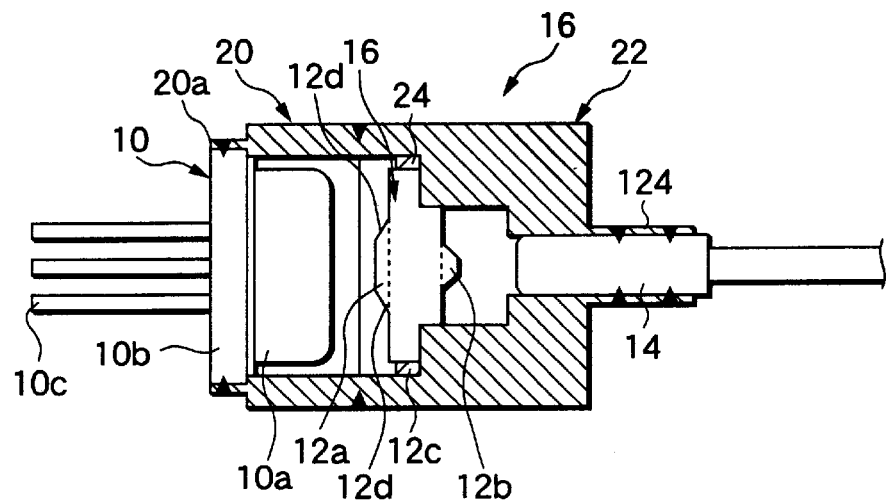
FIGS. 1A and 1B are diagrams useful in explaining an embodiment of an optical module according to the present invention.
Figure 1B:
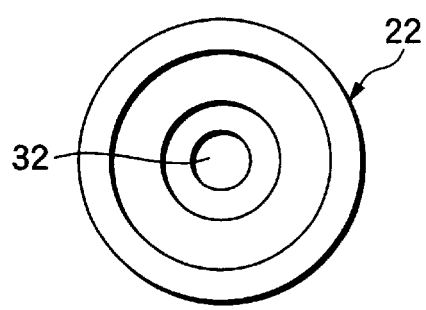

FIGS. 1A and 1B are diagrams useful in explaining an embodiment of an optical module according to the present invention. FIG. 1A is a cross sectional view showing the optical module assembled, and FIG. 1B is a cross sectional view showing a housing in the optical module. The optical module includes a hermetically sealed, semiconductor light-emitting device (e.g., laser diode LD) 10, a lens structure 12 and a housing 16 which holds those components and which can fittingly receive a ferrule 14 holding an optical fiber to which the optical module is coupled. When the ferrule 14 is fixed to the optical module, the semiconductor light-emitting device 10 is optically coupled to the optical fiber of the ferrule 14, through the lens structure 12. The housing 16 in this embodiment is designed such that a device holder 20 for holding the semiconductor light-emitting device 10 and a lens holder 22 for holding the lens structure 12, which is provided separately from the device holder 20, are fixed together while being aligned with each other. A receptacle 124 for fittingly receiving the ferrule 14 holding the optical fiber is coaxially provided to the lens holder 22.

Figure 2:
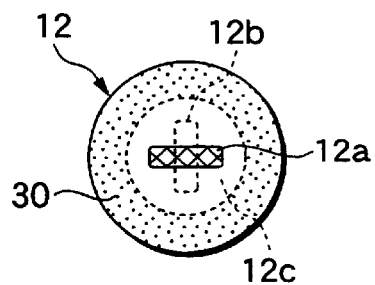
FIG. 2 is a front view showing a lens structure of the optical module when viewed from a semiconductor light-emitting device.

The lens structure 12 to be assembled into the optical module includes a pair of cylindrical lens portions 12a and 12b. Those lens portions are separated from each other while being oriented orthogonal to each other. In the illustrated embodiment, the lens structure 12 is formed as a one-piece molded piece having such a structure that the cylindrical lens portions 12a and 12b are disposed on both side surfaces of a disc-like base 12c. An arrangement of those cylindrical lens portions is best illustrated in FIG. 2. In the figure, a cross-hatched rectangular portion represents the cylindrical lens portion 12a located at a first surface (light incident surface). A rectangular portion enclosed by a broken line represents the cylindrical lens portion 12b located at a second surface (light emission surface).

The device holder 20 is a cylindrical member made of metal, and includes a relatively thin device mount 20a, which is located at one end of the device holder. The semiconductor light-emitting device 10 is constructed such that its device body is hermetically packed in a hermetic package 10a, and lead wires 10c are led outside from the device body, through a base 10b. In assembling, the hermetic package 10a of the semiconductor light-emitting device is inserted into the device holder 20, and the base 10b is fitted to a stepped part of the device holder and in this state, it is welded to the device holder.

The lens holder 22 is also a cylindrical member made of metal. A lens mount is defined by the inner side of one end of the holder, and a receptacle 124 is provided to the other end. A stepped part is provided to the inner surface of the lens mount. The plate-like base of the lens is put on the stepped part, and the peripheral portion of the base is bonded to the stepped part by adhesive 24. An adhesion margin near the outer periphery of the base 12c of the lens is designated by reference numeral 30 in FIG. 2. The receptacle 124 is a cylindrical member having a thin thickness. The ferrule 14 is inserted through the inside of the receptacle and a center hole 32 of the lens holder, and in this state, it is welded to the receptacle.

The end face of the device holder 20 is put on the end face of the lens holder 22 while being aligned with each other, and firmly coupled together by welding.

In an application where light emitted from the semiconductor light-emitting device is radiated into a space, viz., it is not coupled to the optical fiber, the device holder of FIG. 1 may be modified, not having the thin cylindrical receptacle.

Configuration, structure, material and joining method of the housing may be selected appropriately. While the device holder 20 is separated from the lens holder 22 in the housing 16 mentioned above, those holders may take the form of a one-piece construction, if required. For the semiconductor light-emitting device, its base may be joined to the end face of a cylindrical member, if necessary. Its material maybe synthetic resin instead of metal. While the laser welding is mainly used for the assembling in the embodiment mentioned above, adhesive may be used instead of the laser welding. If required, a mechanical fixing method may be used.

A lens of a single-piece construction may easily be formed by injection molding of transparent resin. Press molding using glass material may also be used for the same purpose.

Alternatively, the first and second surfaces of the lens may separately be molded and combined into a single structure of lens. Specifically, a pair of members, each having a base and a cylindrical lens portion on one side surface of the base, are coupled together in a back-to-back fashion to form the lens structure. In this case, those lens portions must optically be aligned with each other (within a plane). The positioning of them in the optical axis is also possible, however. Thence, freedom is advantageously increased in adjusting a condensing beam profile. An equation describing a curved surface profile of the cylindrical lens portion will generate a useful curved surface for the emitted light having the Gaussian distribution. For the cylindrical lens portion, its end face may be vertically cut. In actual design, a height of the end face of the cylindrical lens portion is gradually reduced toward the surface of the base as shown by reference numeral 12d in FIG. 1 (the similar slopes are provided to the cylindrical lens portion 12b).

The semiconductor light-emitting device may be a light emitting diode (LED) in place of a laser diode. Most of the light emitting diodes are relatively circular in radiation pattern. It may be applied to a case where the circular radiation pattern is converted into a flat radiation pattern. It may be used as a beam converter for shaping the radiation pattern for the purpose of the optical coupling to a slab waveguide.

The optical module shown in FIGS. 1A and 1B is constructed as a pig-tail type optical module in which the ferrule 14 is fixed to the receptacle 124 by soldering or the like. However, the present invention should not be restricted thereto or thereby. For example, the present invention is applicable to a receptacle type optical module as disclosed in U.S. Pat. No. 5,973,862.

Figure 4:
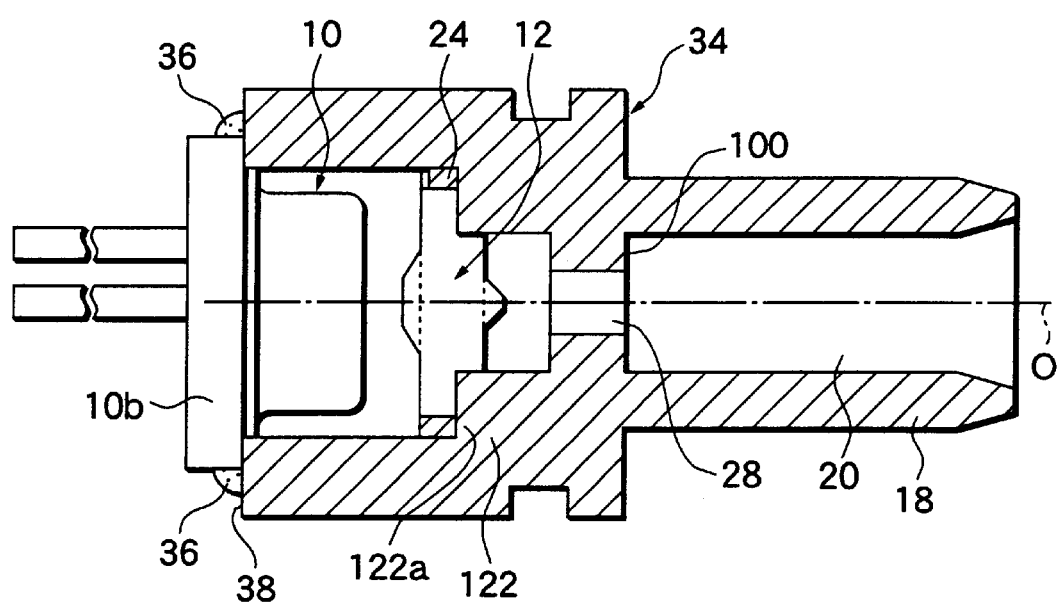
FIGS. 4 is a diagram useful in explaining another embodiment of an optical module according to the present invention.

FIG. 4 shows an embodiment of a receptacle type optical module, in which the lens structure 12 is provided. The receptacle type optical module shown in FIG. 4 includes a resin housing 34 of a substantially cylindrical molded unitary structure. The resin housing 34 has an end 38 on which the semiconductor light-emitting device 10 is mounted, a lens holding section 122 extending from the end 38 and holding the lens structure 12 therein, and a receptacle 18 to which a ferrule of an optical plug is to be detachably mounted. Reference numeral 28 designates a hole substantially concentric to an optical path O extending from the semiconductor light-emitting device 10 through the lens structure 12 to a bore 20 of the receptacle 18. When the ferrule of the optical plug is fittingly received in the receptacle 18, the semiconductor light-emitting device 10 is optically coupled to an optical fiber held in the ferrule of the optical plug through the lens structure 12. The hole 28 and the bore 20 cooperatively define a step portion 100 therebetween, with which an end face of the ferrule is contacted to position the optical fiber in place in the direction of the optical path O.

In assembly, the lens structure 12 is inserted through the end 38 to be contacted with a step portion 122a of the lens holding section 122, and is fixed to the lens holding section 122 by adhesive 24. Thereafter, the ferrule of the optical plug is inserted into the bore 20 of the receptacle 18 to be fittingly received by the receptacle 18. Under this condition, the semiconductor light-emitting device 10 is disposed so that a stem portion of the semiconductor light-emitting device 10 is contacted with the end 38, and the semiconductor light-emitting device 10 is slightly moved along the end 38 to determine an optimum position where the light emitted from the semiconductor light-emitting device 10 is coupled to the optical fiber held in the ferrule of the optical plug the most efficiently. If determined, then the semiconductor light-emitting device 10 is fixed to the housing 34 by adhesive 36 to be disposed at the optimum position.

EXAMPLE

To realize a semiconductor light-emitting device of high output power on the order of 1 W, a laser diode whose channel width is broadened to about 100 $\mu$m was used for the semiconductor light-emitting device. The laser diode was optically coupled with a graded index fiber (GI-50/124: core diameter/clad diameter) through a lens structure. As a result, a pig tail optical module as shown in FIG. 1A was manufactured.

Figure 3A:
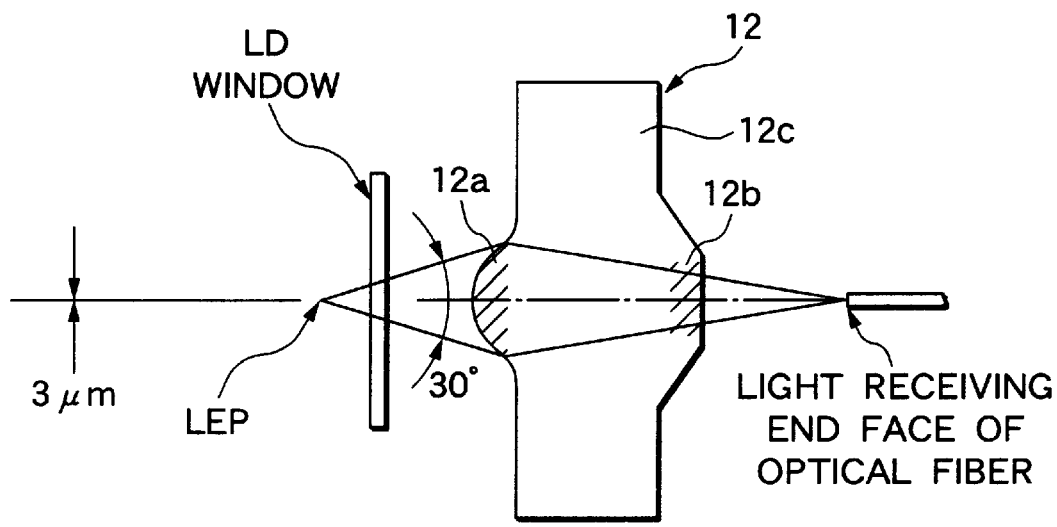
FIGS. 3A and 3B are diagrams for explaining how the lens structure operates.
Figure 3B:
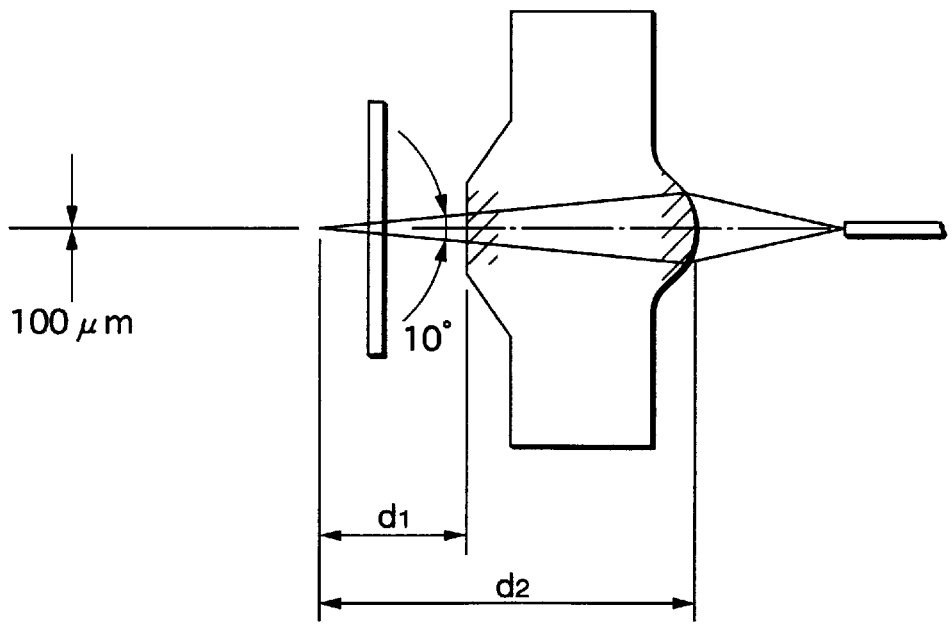

A near field pattern of the laser diode used was 100 $\mu$m×3 $\mu$m, and a radiation angle of the same was 1.0°×30° (for both, the horizontal direction×the vertical direction), and thus its aspect ratio was large. In lens design, a radiation pattern is modeled, and a beam tracing method was used. FIGS. 3A and 3B are diagrams for explaining how the lens structure operates. FIG. 3A shows the lens structure 12 in section taken along the vertical direction, and FIG. 3B shows the lens structure 12 in section taken along the horizontal direction. A cylindrical lens portion 12a located at the first surface of the lens structure 12 is horizontally arranged, while a cylindrical lens portion 12b located at the second surface of the lens structure 12 is vertically arranged.

Since acrylic transparent resin was used for the lens structure, a refractive index of the lens was set at 1.51. Therefore, an apex line of the lens portion 12a on the first surface of the lens structure was located at a position separated from a light emitting point by a distance d1. The distance d1 was 2.5 mm.

The lens portion 12a on the first surface was profiled to present a cylindrical surface having a curvature where R=0.75 and K=−1.4 in the following non-spherical surface equation for the vertical direction beam:

$$Z=((1/R)X^2)/(1+(1-(1+K(1/R)^2X^2)^{1/2})$$

In the above equation, Z is an amount of cutting from a flat surface.

An apex line of the lens portion 12b on the second surface of the lens structure was located at a position separated from the light emitting point by a distance d2. The distance d2 was 6.0 mm. The lens portion 12b on the second surface was profiled to present a cylindrical surface having a curvature where R=−0.85 and K=−1.3 in the above non-spherical surface equation for the horizontal direction beam.

The lens structure in which the thus designed cylindrical surfaces are disposed on both side surfaces while being oriented orthogonal to each other was injection molded using acrylic transparent resin. The outside diameter of the lens structure was 5 mm, the thickness was 4 mm, and the effective lens region was 2.5 mm×2.5 mm.

As shown in FIG. 1, the thus produced lens structure and the ferrule were coaxially set to the lens holder. A laser diode was fixed in advance to the device holder. After the optical alignment, those holders were firmly coupled with each other by a spot welding method using YAG laser pulses. The optical alignment was conducted such that the laser diode was turned on, a quantity of light emitted from the optical fiber was monitored, upon occasion, by an optical power meter, and the relative positions of those holders to maximize the quantity of light were sought while monitoring the relative positions.

Coupling efficiency (fiber coupling quantity/total quantity of light emitted from the laser diode) of the optical module thus manufactured was 84%. This figure is considerably larger than 45%, which is the coupling efficiency of a conventional optical module using an optical system having two spherical lenses. This proved an advantage of an optical system of the optical module of the invention. A beam profile transformed by the lens was measured. The result of the measurement was that its area was 32 $\mu$m×10 $\mu$m at the end face of the optical fiber and an incident NA was 0.19×0.16 (for both, the horizontal direction×the vertical direction). It was confirmed that the aspect ratio was improved as designed.

As seen from the foregoing description, the optical module includes a lens structure having a pair of cylindrical lens portions which are separately disposed while being oriented orthogonal to each other. Therefore, for a horizontal component and a vertical component of light emitted from a light emitting point, effective lens surfaces can be located at positions spaced from the light emitting point by different distances. Curvatures of the effective lens surfaces can be designed independently. Consequently, an optimum lens design of high freedom can be realized. It is possible to couple the optical module to another optical member at high coupling efficiency, and easily shape the radiation pattern.

As to the metallic mold used to manufacture the lens structure, the two-dimensional (cylindrical) machining suffices to provide the mold with an effective lens forming region which requires high accuracy in its machining. Therefore, it is relatively easy to form a lens surface of small curvature. Further, the lens structures can easily be mass produced using an injection molding of transparent resin, or the like.

What is claimed is:

1. An optical module comprising:
   a housing;
   a semiconductor light-emitting device; and
   a lens structure,
   wherein the semiconductor light-emitting device and the lens structure are held by the housing and optically aligned with each other, and wherein the lens structure includes a pair of cylindrical lens portions, which are oriented orthogonal to each other and located at positions spaced from each other in an optical axis direction, and wherein each of the cylindrical lens portions is profiled as a non-spherical surface defined by $$Z=((1/R)X^2)/(1+(1+K(1/R)^2X^2)^{1/2})$$

where z is an amount of cutting measured from a planar surface, and R and K are constants.

2. The optical module according to claim 1, wherein the housing is adapted to fixedly receive a ferrule holding an optical fiber to which the optical module is to be coupled.

3. The optical module according to claim 1, wherein the housing is adapted to fittingly receive a ferrule of an optical plug to which the optical module is to be coupled.

4. The optical module according to claim 1, wherein the cylindrical lens portions are located on both side surfaces of a plate-like base, while being oriented orthogonal to each other, and the lens structure is formed with a one-piece member molded of transparent resin.

5. The optical module of claim 1 wherein one lens portion of said cylindrical lens portions is profiled with R=0.75 and K=−1.4 and the other lens portion of said cylindrical lens portions is profiled with R=−0.85 and K=−1.3.

6. The optical module of claim 1 wherein one of said cylindrical lens portions has an outside diameter of 5 mm, a thickness of 4 mm, and an effective lens region of 2.5 mm×2.5 mm.

7. A lens for shaping an optical radiation pattern, wherein the lens is formed into a one-piece member having an integral base and integral cylindrical lens portions that are located on respective sides of the base and that are oriented orthogonal to each other wherein each of the cylindrical lens portions is profiled as a non-spherical surface defined by $$z=((1/R)X^2)/(1+(1+K(1/R)^2X^2)^{1/2})$$

where z is an amount of cutting measured from a planar surface, and R and K are constants.

8. The lens according to claim 7, wherein the lens is molded entirely of transparent resin into the one-piece member.

9. The lens of claim 7 wherein said cylindrical lens portions are composed of a transparent acrylic resin.

10. The optical module of claim 1 wherein said cylindrical lens portions are composed of a transparent acrylic resin.

11. The lens of claim 7 wherein one lens portion of said cylindrical lens portions is profiled with R=0.75 and K=−1.4 and the other lens portion of said cylindrical lens portions is profiled with R=−0.85 and K=−1.3.

12. The lens of claim 7 wherein one of said cylindrical lens portions has an outside diameter of 5 mm, a thickness of 4 mm, and an effective lens region of 2.5 mm×2.5 mm.

* * * * *